United States Patent [19]

Dreyer et al.

[11] Patent Number: 5,794,066
[45] Date of Patent: Aug. 11, 1998

[54] APPARATUS AND METHOD FOR IDENTIFYING THE FEATURES AND THE ORIGIN OF A COMPUTER MICROPROCESSOR

[75] Inventors: Robert S. Dreyer, Sunnyvale, Calif.; William M. Corwin, Portland, Oreg.; Tsu-Hua Wang, Fremont; Daniel G. Lau, Los Altos, both of Calif.; Frederick J. Pollack, Portland, Oreg.

[73] Assignee: Intel Corporation, Santa Clara, Calif.

[21] Appl. No.: 644,678

[22] Filed: May 7, 1996

Related U.S. Application Data

[60] Division of Ser. No. 23,916, Feb. 26, 1993, which is a continuation-in-part of Ser. No. 938,288, Aug. 31, 1992.

[51] Int. Cl.$^6$ .................................................. G06F 11/30
[52] U.S. Cl. ................. 395/800.32; 395/500; 395/568; 395/800.42
[58] Field of Search ........................ 395/800, 500, 395/427, 800.32, 800.42, 568; 711/100

[56] References Cited

U.S. PATENT DOCUMENTS

| | | |
|---|---|---|
| 4,853,844 | 8/1989 | Kono . |
| 4,866,769 | 9/1989 | Karp . |
| 4,964,074 | 10/1990 | Suzuki et al. . |
| 4,967,346 | 10/1990 | Freidin . |
| 4,970,640 | 11/1990 | Beardsley et al. . |
| 4,974,191 | 11/1990 | Amirghodsi et al. . |
| 5,113,518 | 5/1992 | Durst, Jr. et al. . |
| 5,121,486 | 6/1992 | Kurihara et al. . |
| 5,144,551 | 9/1992 | Cepulis . |
| 5,163,145 | 11/1992 | Parks . |
| 5,214,652 | 5/1993 | Sutton . |
| 5,287,531 | 2/1994 | Rogers, Jr. et al. . |
| 5,408,611 | 4/1995 | Kim . |
| 5,426,767 | 6/1995 | Crosswy . |
| 5,459,854 | 10/1995 | Sherer et al. . |
| 5,640,536 | 6/1997 | King et al. .................... 395/500 |
| 5,640,537 | 6/1997 | Jessen et al. ................. 395/500 |

FOREIGN PATENT DOCUMENTS

| | | |
|---|---|---|
| 0313848B1 | 5/1989 | European Pat. Off. . |
| 0351961A2 | 1/1990 | European Pat. Off. . |
| 3624373C2 | 1/1987 | Germany . |
| 2230362 | 10/1990 | United Kingdom . |
| 2264375 | 8/1993 | United Kingdom . |

Primary Examiner—Alyssa H. Bowler
Assistant Examiner—Walter D. Davis, Jr.
Attorney, Agent, or Firm—Blakely, Sokoloff, Taylor & Zafman

[57] ABSTRACT

A multi-level identification apparatus and method for providing at least two types of identification information, including a first type for identifying the origin of a microprocessor and the number of levels of identification information available, and a second type for identifying a family, a model, a stepping ID, and features of a microprocessor. The apparatus includes a first memory element for storing an indicia string that identifies the origin of the microprocessor. The apparatus also includes a second memory element for storing other microprocessor ID data including data fields for specifically identifying the microprocessor. The apparatus includes control logic for executing an ID instruction that reads the indicia string or the microprocessor ID data, dependent upon a preselected type. Whichever identification information is read, it is stored in one or more general purpose registers for selective reading by a programmer. The method is available at any time while the microprocessor is operating.

15 Claims, 6 Drawing Sheets

FIG_1

FIG_2

FIG_4

FIG_5

FIG_6

APPARATUS AND METHOD FOR IDENTIFYING THE FEATURES AND THE ORIGIN OF A COMPUTER MICROPROCESSOR

REFERENCE TO RELATED APPLICATION

This is a divisional of application Ser. No. 08/023,916, filed Feb. 26, 1993, which is a continuation-in-part of an application Ser. No. 07/938,288, entitled "Apparatus and Method for Identifying a Computer Microprocessor," by Robert S. Dreyer and Donald B. Alpert, filed Aug. 31, 1992, which is expressly incorporated by reference herein.

BACKGROUND OF THE INVENTION

1. Field of the Invention

The present invention relates to a circuit and method for identifying a computer microprocessor and its features during start-up and operation.

2. Description of Related Art

During computer operation, identifying the origin and family of the processor in a computer system can be useful. Identification of the origin is useful to verify that the microprocessor will perform to the quality and performance standards of the original. During initialization and boot up operations, identifying the microprocessor family, model, and stepping ID is important so that particular features can be installed by the initialization software. Identification of the microprocessor can be useful while installing or running software.

Microprocessors are complex electrical circuits formed in a semiconductor chip. Microprocessors are the heart of modern computers, and an industry has developed around designing and fabricating them. Many research and development dollars have been spent and continue to be spent to develop higher performance microprocessors. The result has been a large increase in processing speed, far greater processing capabilities, and a marked decrease in the physical size of computers.

A wide variety of microprocessors are available from a number of vendors. Microprocessors vary in their features and their errata ("bugs"). Even similar microprocessors can have significant variations from vendor to vendor.

Software designers (i.e., programmers) design their programs to operate on a specific microprocessor with specific features. A programmer cannot be certain that his program will operate in the intended manner on any other microprocessor. To a programmer and to a user, even minor inconsistencies in operation may be more than just a nuisance: they may be fatal to program operation or provide incorrect results.

It would be an advantage to provide a microprocessor that can identify its origin to a program. It would also be an advantage if the microprocessor could identify its features. If such a microprocessor could identify its origin and its features, programmers could design their programs to verify the origin, enable appropriate features, and know that programs will operate as intended. It would also be a further advantage if the microprocessor could provide information that identifies the individual microprocessor by family, model, and stepping ID in addition to the origin and features of the microprocessor.

SUMMARY OF THE INVENTION

An object of the present invention is to provide an identification apparatus and method for identifying a microprocessor during operation. The identification apparatus and method can supply an indicia of origin that can be used to verify that the microprocessor is an original. Furthermore, the identification apparatus and method can provide other microprocessor ID information indicative of features and other information such as the microprocessor's family, model, and stepping ID. A multi-level identification system is provided which in the preferred embodiment has two levels: a first level that provides the indicia of origin and a second level that provides other microprocessor ID information. The method is available at any time while the microprocessor is operating, for example during initialization of the system software, installation of a program, or while a program is running.

In a microprocessor, the identification apparatus comprises a register for storing and reading data, a first memory element including indicia of origin data, a second memory element including microprocessor ID data including data fields for identifying the microprocessor, and a decoder for receiving an ID instruction. Control circuitry is provided for executing the ID instruction received from the decoder, including first execution means for reading the indicia of origin data from the first memory element and storing it in a register, second execution means for reading the microprocessor ID data from the second memory means and storing it in the register, and selection means for selecting between the first and the second execution means.

The first and second memory elements may be formed in one or more processor ID registers formed in the microprocessor to hold the indicia of origin data and the microprocessor ID data. Alternately, the indicia of origin data and the microprocessor data may be stored in the constant ROM that also holds data used by microcode instructions stored in microcode ROM. Preferably, the indicia of origin data is stored in constant ROM, and the microprocessor ID information is stored in the processor ID register, which is a separate register that can be modified more easily in subsequent models than the constant ROM.

The second memory element may include reserved bits that have locations assigned to them. These reserved bit locations are not implemented to include data. The reserved bits are provided to avoid compatibility problems that would be encountered if the size of the processor ID register were expanded in future microprocessors. The data fields in the second memory element may include a family field indicative of the microprocessor's family, a model field indicative of the microprocessor's model, and a revision field indicative of the microprocessor's errata or stepping ID.

System-level programmers, application programmers, users, and others may benefit from ready access to the indicia of origin and the other identification information. By specifically identifying the origin of the microprocessor, the method provides a simple, reliable way to assure a programmer that his program is being run by an original microprocessor. By identifying the microprocessor and determining its features, the programmer can enable features appropriate to the specific microprocessor, and programs or code sequences to work-around the bugs can be installed.

The identification system is particularly useful when implemented in microprocessor families whose development is continually advancing with the introduction of newer models and families. The identification method can be programmed in software and is compatible with older families as well as the newer families that implement the identification circuitry. In other words, the identification software can be run without causing an exception on older processors that did not implement the identification system and method. Furthermore, new versions of some existing models can be retrofit with the identification circuitry to provide identification information. The identification system is useful in multi-mode microprocessors, and can be used from within any mode of the microprocessor's operation. The system is extensible, and in future models, the amount of ID information can be increased. To distinguish between some previous processors without the control circuitry for identification apparatus, and more recent processors that include this control circuitry, the identification apparatus may in addition to the above elements, comprise a read/write memory element including an ID flag indicative of the existence of the identification control circuitry, and a test means for testing the ID flag, including a test program for supplying a sequence of instructions that tests the ID flag, and a program for supplying the ID instruction.

Using this additional circuitry, a computer-implemented method for identifying a microprocessor includes distinguishing between a microprocessor in a first group that does not implement a microprocessor ID instruction and a microprocessor in a second group that does implement a microprocessor ID instruction. The method includes the steps of executing a flag test instruction sequence that tests an ID flag to determine whether the microprocessor is in the first group or the second group. This step avoids generation of an illegal opcode exception that would be generated if the ID instruction were attempted to be executed on a prior microprocessor which does not implement the ID instruction. If execution of the flag test instruction sequence indicates that the ID instruction has not been implemented, then the microprocessor is identified as a member of the first group, and program steps are executed to avoid execution of the ID instruction. However, if execution of the flag test instruction sequence indicates that the ID instruction has been implemented, then the microprocessor is identified as a member of the second group, and the program allows execution of the ID instruction, which supplies the contents of the microprocessor ID memory element to a general purpose register. Additional general purpose registers may be cleared to provide a potential destination for additional ID data that may be useful in future implementations.

A more specific computer-implemented method for identifying a microprocessor first distinguishes between a basic set of families and an advanced set of families before testing the ID flag. The basic set of families does not have a bit location for the ID flag in the flags register, and therefore any attempt to test the ID flag may create an illegal opcode exception. If the microprocessor is identified as a member of the basic set of families, then the program avoids executing the test flag instruction sequence and the ID instruction. Then, other tests may be performed as appropriate to more particularly identify the basic microprocessor. The advanced set of families does have a bit location for the ID flag, and therefore if the microprocessor is identified as a member of that set, then the test flag instruction sequence can be performed to distinguish whether the microprocessor is a member of the first or the second group, and the ID instruction can be executed accordingly.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

DETAILED DESCRIPTION OF THE PREFERRED EMBODIMENT

FIGS. 1 through 6 of the drawings disclose various embodiments of the present invention for purposes of illustration only. One skilled in the art will readily recognize from the following discussion that alternative embodiments of the structures and methods illustrated herein may be employed without departing from the principles of the invention. In the following description, discussion begins with a description of a single level identification system for identifying the family, model, stepping ID, and features, with reference to FIGS. 1 through 4. Subsequently, a two-level identification system is described with reference to FIGS. 1 through 6 which allows a programmer access to additional information including an indicia of origin. Thus, using the two-level system, a programmer can choose to receive either a first type of information including the indicia of origin and the number of available levels, or a second type of information including the family, model, and stepping ID.
Description of Identification of Family, Model, Stepping ID and Features Reference is made to FIG. 1 which is a block diagram of a microprocessor 10 and related software illustrated generally at 12. The microprocessor 10 includes a plurality of registers including a read/write memory element 14 (flags register). The flags register 14 includes an AC flag 16 and an ID flag 18. The AC flag 16 and the ID flag 18 are preferably single bits in the flags register 14. During initialization, flags register 14 is typically loaded with a value particular to the software and hardware. During operation, the flags register 14 is available to a programmer if he first "pushes" it onto a stack and then "pops" it out to another register. The microprocessor 10 also includes a first general purpose register 20 and a second general purpose register 22. The registers 20, 22 may include any standard read/write register commonly used in microprocessors. Generally, the general purpose registers 20, 22 are "visible" to a programmer in assembly language. In other words, a programmer can write to these registers from any other register or memory, or he can read from this register to any other register or memory. These registers may be manipulated, so that selected bits can be read from or written to. The data in such registers may be termed "maskable". The microprocessor 10 may also include a number of additional registers, indicated at 24, which may be used for purposes useful to operate the processor.

Figure 1:
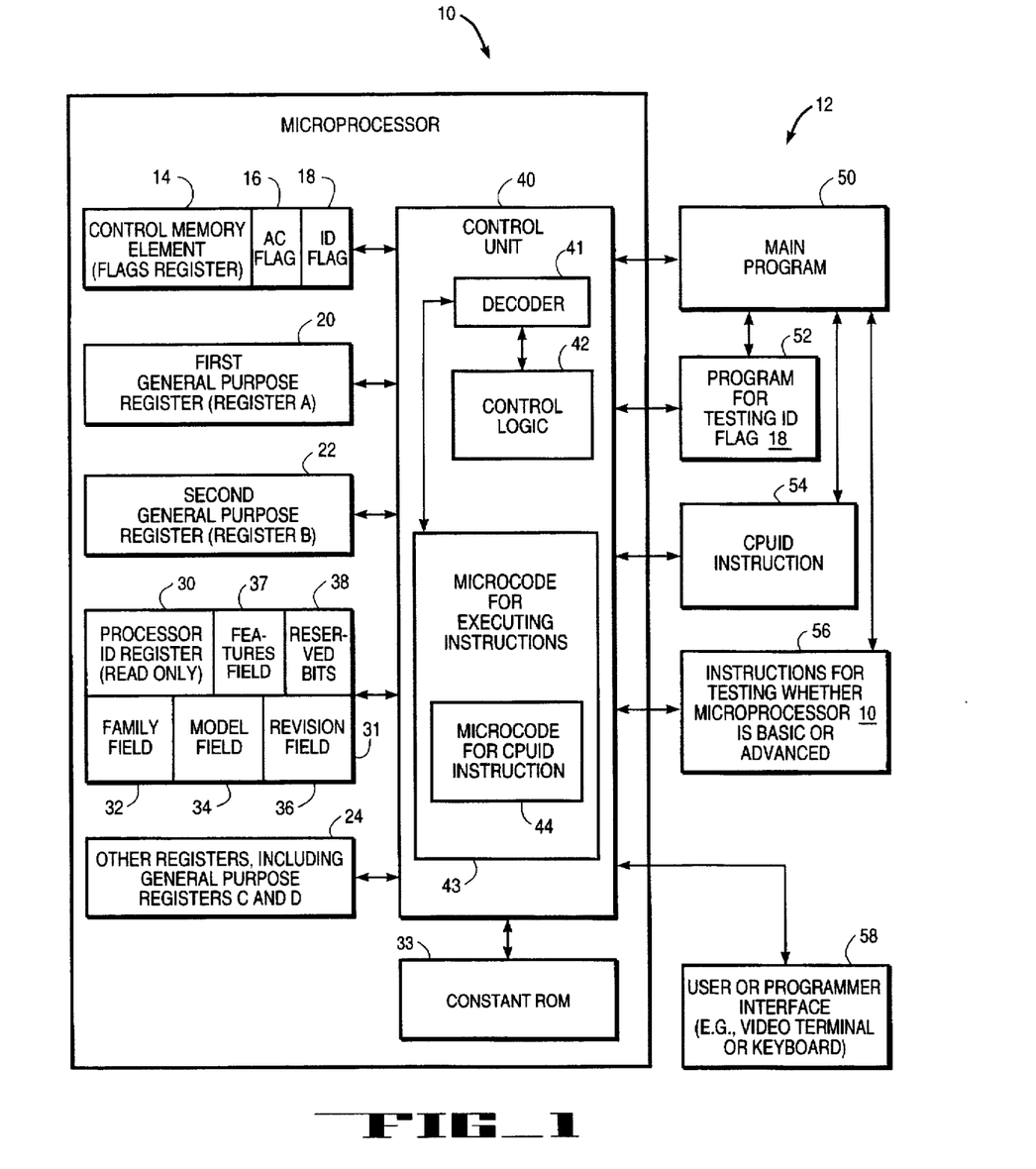
FIG. 1 is a block diagram of the architecture of a microprocessor including a microprocessor ID register for storing identification information.

The microprocessor 10 also includes a processor ID memory element, for example a processor ID register 30, in which processor ID information 31 is encoded. This ID memory element is not visible to a programmer; i.e., the ID memory element cannot be manipulated directly. For example, the ID memory element cannot be read directly into any other selected register unlike the general purpose registers 20,22. During manufacture of one embodiment of a microprocessor built in accordance with the principles of the present invention, the processor ID register 30 is formed on the microprocessor 10 as a read-only register. The processor ID register 30 may be implemented in constant ROM (i.e., read-only memory for data), but preferably it is in a separate register that, for manufacturing reasons, can be modified easier in subsequent models than the constant ROM which is a dense structure and difficult to change. Alternately, the processor ID information 31 may be encoded in the microcode that executes a CPUID instruction, to be discussed below and therefore may be stored in microcode read-only memory. In still other embodiments, the processor ID register 30 may be implemented in more than one register, so that ID information is located in several registers, which serve an equivalent purpose.

The ID memory element as implemented in a processor ID register 30 includes a family field 32 that is indicative of the identified microprocessor's family. Different families are usually distinguished by major architectural differences that provide additional features to applications programmers and systems programmers. The processor ID register 30 may also include a model field 34 that includes data indicative of the model of the microprocessor within the family. For example, in the INTEL microprocessors, the letters "ISXTM™", and "DXTM™" represent different models within the same family of microprocessors. While different families include different features that are usually apparent to both applications programmers and systems programmers, the model of a microprocessor will likely affect only a systems programmer.

The processor ID register 30 also includes a revision field 36 including data indicative of the microprocessor's stepping ID. When a microprocessor is manufactured, it is identified with a particular stepping ID that represents the version of the microprocessor. Different versions are necessitated by errata, or "bugs" that often unexpectedly arise to adversely affect the microprocessor's operation. Such errata may be the unfortunate result of a development process which often cannot anticipate all possibilities, or may simply represent a manufacturing error that affects the microprocessor's operation. These bugs can be fixed in later models, however earlier models may still be in use. Therefore a stepping ID is implemented to distinguish between the different versions of the microprocessors. Generally the errata will only be evident to systems programmers, however in some instances a complex series of instructions supplied by an applications programmer will also create a problem. Generally, once the existence of a bug has been identified, software fixes are developed to "work around" the bug. These programs are often termed "work-arounds" or "work-around programs". Such programs are common and useful, but may require complex instruction sequences, particularly for the earliest manufactured versions of a microprocessor.

The processor ID register 30 in other embodiments may include additional fields, such as a field indicative of the serial number of a particular microprocessor, or other information useful for identification such as a features field that specifies the existence of specific features. For use in accommodating additional fields that may be implemented in the future, reserved bits 38 are included in the processor ID register 30. The reserved bits 38 are not assigned any meaning or significance unless they are implemented.

Microprocessor 10 also includes a control unit 40. The control unit 40 includes conventional decoder circuitry 41 for receiving and decoding information. It also includes control logic 42 for executing instructions supplied to it from the decoder 41. The control logic uses microcode 43 for executing instructions as necessary. In the preferred embodiment, the microcode 43 also includes CPUID instruction microcode 44 for executing a CPUID instruction, described in more detail below. In alternate embodiments, circuitry for executing the CPUID instruction may be located wholly within the control logic 42.

Software that executes in the control unit 40, illustrated generally by the programs 12, includes a main program 50, which illustrates any of a number of programs. For example, the main program 50 may include a program that initializes the operating system, BIOS initialization software, or applications programs. The main program 50 supplies instructions to the control unit 40, or alternately, it may select another program to supply instructions to the control unit 40. These programs include a test flag instruction sequence 52 for testing the ID flag 18, and a CPUID instruction 54 which may be a single instruction, for example. Also, the programs 12 include preliminary test instructions 56 for testing whether the microprocessor is basic or advanced. Additional programs, not shown, may also be available.

The microprocessor ID memory element is accessed via a microprocessor CPUID instruction 54. The CPUID instruction 54 is implemented in appropriate circuitry within the control unit 40 that recognizes the opcode of the CPUID instruction 54 in the decoder 41 and executes the appropriate steps in the control logic 42 to supply the identification information 31 in the ID memory element to a general purpose register 20,22, that is visible to a programmer. The identification information 31 is then available to the programmer, and can be manipulated by the programmer for any desired purpose. For example, he may read the data from each field to ascertain which features are appropriate to the identified microprocessor.

In the embodiment wherein the ID information is stored in the processor ID register 30 and the microcode 43 includes the CPUID instruction microcode 44, a microcode sequence is included therein to read the contents of the processor ID register 30 and store them in a general purpose register such as the first general purpose register 20 or the second general purpose register 22. The microcode 44 functions to specify the registers for the CPUID instruction 54.

In order to read or supply directions to the control unit 40, a user programmer interface 58 may be connected to the microprocessor 10. The interface 58 may be used, for example, to read information stored in one of the registers 20, 22, 24 to a video terminal. Furthermore, the user or programmer interface 58 may include a keyboard for manual access to the content of the registers 20, 22, and 24.

Figure 2:
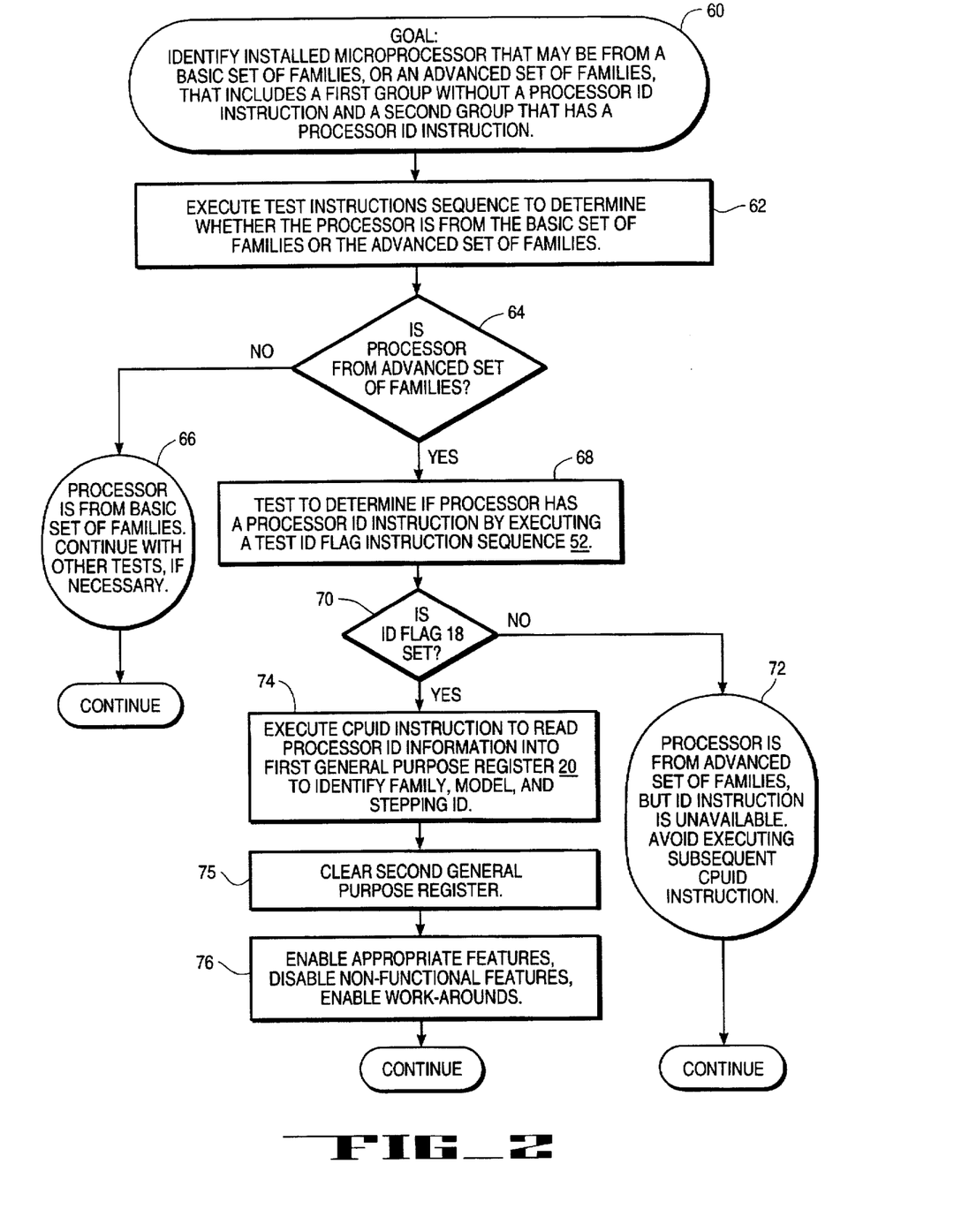
FIG. 2 is a flow chart of method steps to determine the microprocessor ID.

Reference is now made to FIG. 2 which illustrates a computer-implemented method of the preferred embodiment. In order to describe the environment for the method, a box 60 sets a goal of identifying an installed microprocessor in a computer. The installed microprocessor may be a member of a basic set of families or an advanced set of families. All families are compatible with each other, however in the advanced families, more features and more instructions are often available than in the basic set of families. The basic set of families does not have a bit location for the ID flag 18 in the flags register 14, and therefore any attempt to test the ID flag 18 may create an illegal opcode exception. The advanced set of families does have a bit location for the ID flag 18. Within the advanced set of families there are two groups: a first group that does not have a processor ID instruction, and a second group that does implement a processor ID instruction. The CPUID instruction 54 is available only in the second group of the advanced families: it is not available in the basic families nor in the first group of the advanced families. If running the CPUID 54 instruction is attempted in the basic families or in the first group of advanced families, then an attempt to execute a CPUID instruction 54 would unfortunately create an illegal opcode exception and likely transfer control to an exception handler which would in all likelihood terminate the program. To avoid the possibility of creating an illegal opcode exception, the following steps are provided.

In execution box 62, the test instruction sequence 56 is executed to determine whether the processor is from the basic set of families or the advanced set of families. As illustrated in decision box 64, if the processor is from the basic set of families, then operation proceeds to the box 66, in which other conventional tests may be performed as necessary to further identify the basic processor. Of course it will be apparent that, if it is determined before starting operation in the box 60 that the processor is already a member of the advanced set of families, then operation can skip directly to the box 68 which tests to determine if the processor has implemented the CPUID instruction 54.

Branching the other direction from the box 64, if the processor is from an advanced set of families, then a further test is performed as illustrated in a box 68 to determine if a processor has a processor ID instruction, by executing the test ID flag instruction sequence 52. As illustrated in decision box 70 if it is determined that the ID flag 18 has not been set, then as illustrated in block 72 it is determined that the processor 10 is from the advanced set of families, but the CPUID instruction 54 is unavailable because it has not been implemented. Therefore, the subsequent CPUID instruction 54 must not be executed. However, if in the decision box 70 it is determined that the ID flag 18 has been set, then the processor 10 has implemented the CPUID instruction 54. Therefore, as illustrated in a box 74, the CPUID instruction 54 is executed. Following that, as illustrated in a box 76, features appropriate to the microprocessor may be enabled. Nonfunctional features are disabled, and appropriate work arounds are also enabled. This will be discussed in more detail with reference to FIGS. 3 and 4. Operation then continues.

Reference is again made to FIG. 2. The following description, with reference to the INTEL families, describes an exemplary basic set of families, and the first and second groups of the advanced set of families.

In a basic set of families such the INTEL microprocessors having numbers 80286 and below, the ID bit 18 does not physically exist because the EFLAGS register in which it resides has a smaller, 16-bit size. Therefore an attempt to execute an ID test bit instruction sequence 52 in those basic families would likely generate an illegal opcode. However, in advanced families such as the INTEL i386™ microprocessor family and the i486™ microprocessor family, the EFLAGS register was enlarged to a 32-bit size. A number of these bits were reserved for use in later models or families, and therefore these bits cannot be set. The reserved bits may be still be read or written without generating an exception, but they will always return the same value. An attempt to set or reset a reserved bit will simply have no effect. Because the reserved bit physically exists, an attempt to execute an ID test bit instruction sequence in these advanced families will not generate an exception.

In the preferred embodiment in the INTEL architecture, the ID bit 18 is implemented in the EFLAGS register in a bit that was originally reserved in the INTEL i386™ microprocessor family and the i486™ microprocessor family. Therefore, the ID test bit instruction sequence 52 will not generate an exception when executed in these families. Furthermore, execution of the ID test bit instruction sequence 52 will indicate whether or not the CPUID instruction 54 is available. For purposes of the present disclosure, microprocessor families such as the i386™ family and the i486™ family in which the ID bit were not implemented are exemplary of the "first group of the advanced families". Microprocessors in which the ID bit 18 is implemented, and which implement the CPUID instruction 54 are exemplary of "the second group of the advanced families". Later versions of the INTEL i386™ and i486™ microprocessors, manufactured subsequently, may incorporate the ID bit 18 in conjunction with the CPUID instruction and a processor ID register. These subsequently manufactured microprocessors would be members of the second group.

Figure 3:
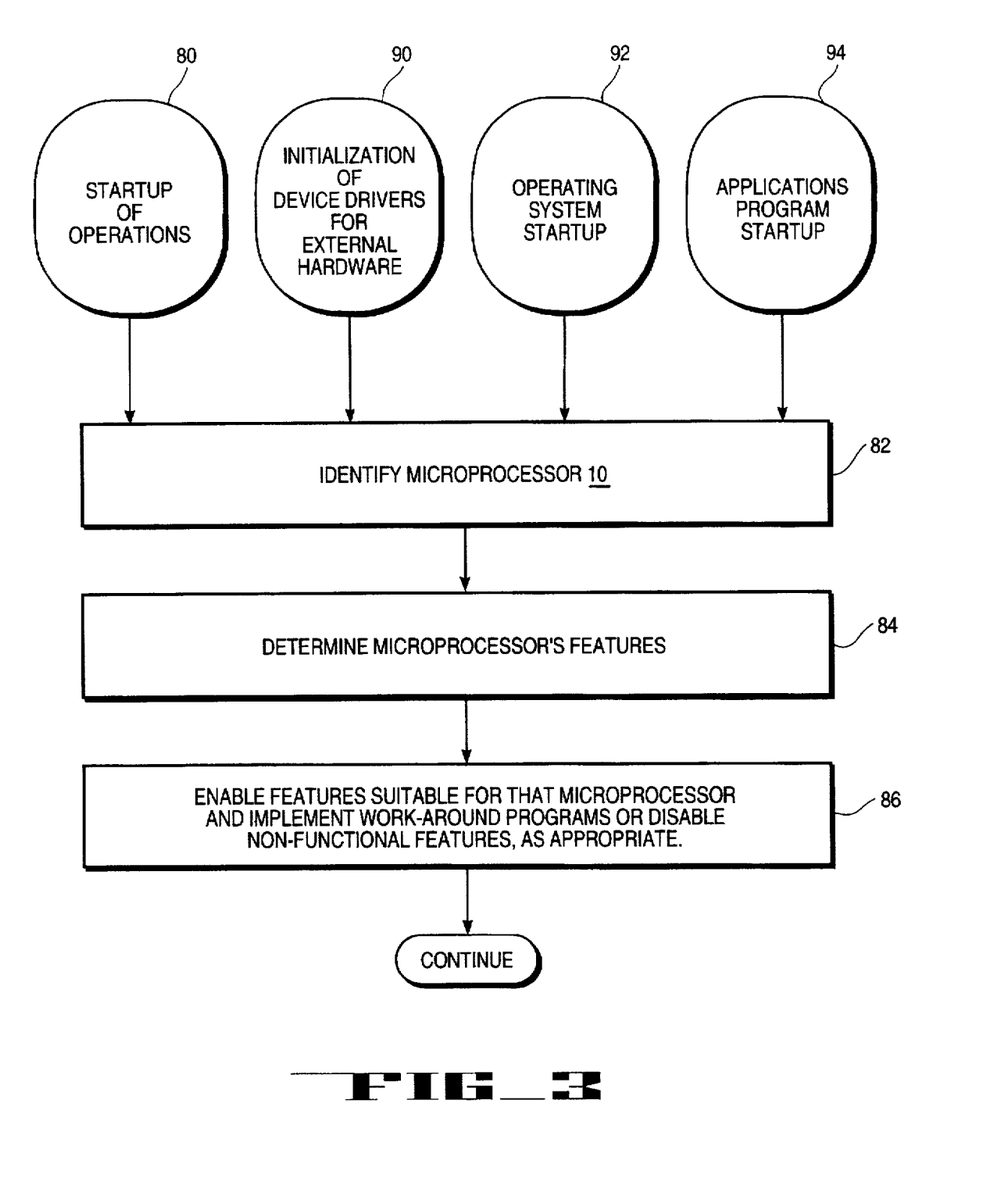
FIG. 3 is a flow chart illustrating identification of the microprocessor and enabling features in several different contexts.

Reference is now made to FIG. 3 which is a flow chart illustrating different uses for the processor identification method described herein. Beginning on the left of FIG. 3 in a block 80, at the startup of operations identification of the microprocessor 10 is often useful. For example, startup of operations may utilize a BIOS code that is run following power up of a microprocessor 10. Following that, as illustrated in a box 82, the microprocessor 10 is identified. Then, in a box 84, the microprocessor's features are determined. Subsequently, as illustrated in a box 86, features are enabled suitable for that microprocessor, work-around programs are implemented and nonfunctional features are disabled, as appropriate. An exemplary microprocessor feature whose enablement is processor-dependent, and a work-around program are discussed below in the discussion accompanying FIG. 4.

In addition to the usefulness of identifying a microprocessor 10 following start up, it may also be useful to identify the microprocessor whenever device drivers for external hardware are initialized. For example, a printer driver may want to know or identify the microprocessor that is operating it. In this event, it would then follow the sequence of operations 82, 84, 86 to identify the microprocessor 10 and enable appropriate features. The device driver initialization is illustrated in a block 90. Furthermore, upon operating system startup as illustrated in a box 92, it may also be useful to identify the microprocessor and enable features as illustrated in the blocks 82, 84, and 86. Similarly, as illustrated in a box 94, upon applications program startup it may also be useful to identify the microprocessor 10 and enable features as illustrated in the blocks 82, 84, and 86.

The examples in which it is useful to identify the microprocessor 10, including the block 80, 90, 92, and 94 are only illustrative of the uses for the identification method described herein. The method may be utilized at any time during the microprocessor's operation, for example, it may be useful to identify the processor during program operation to ascertain whether or not a particular instruction or a particular sequence of instructions can be used, or whether to execute other instructions. In that event, the steps 82, 84, and 86 can be performed to identify the microprocessor 10 and enable appropriate features.

Figure 4:
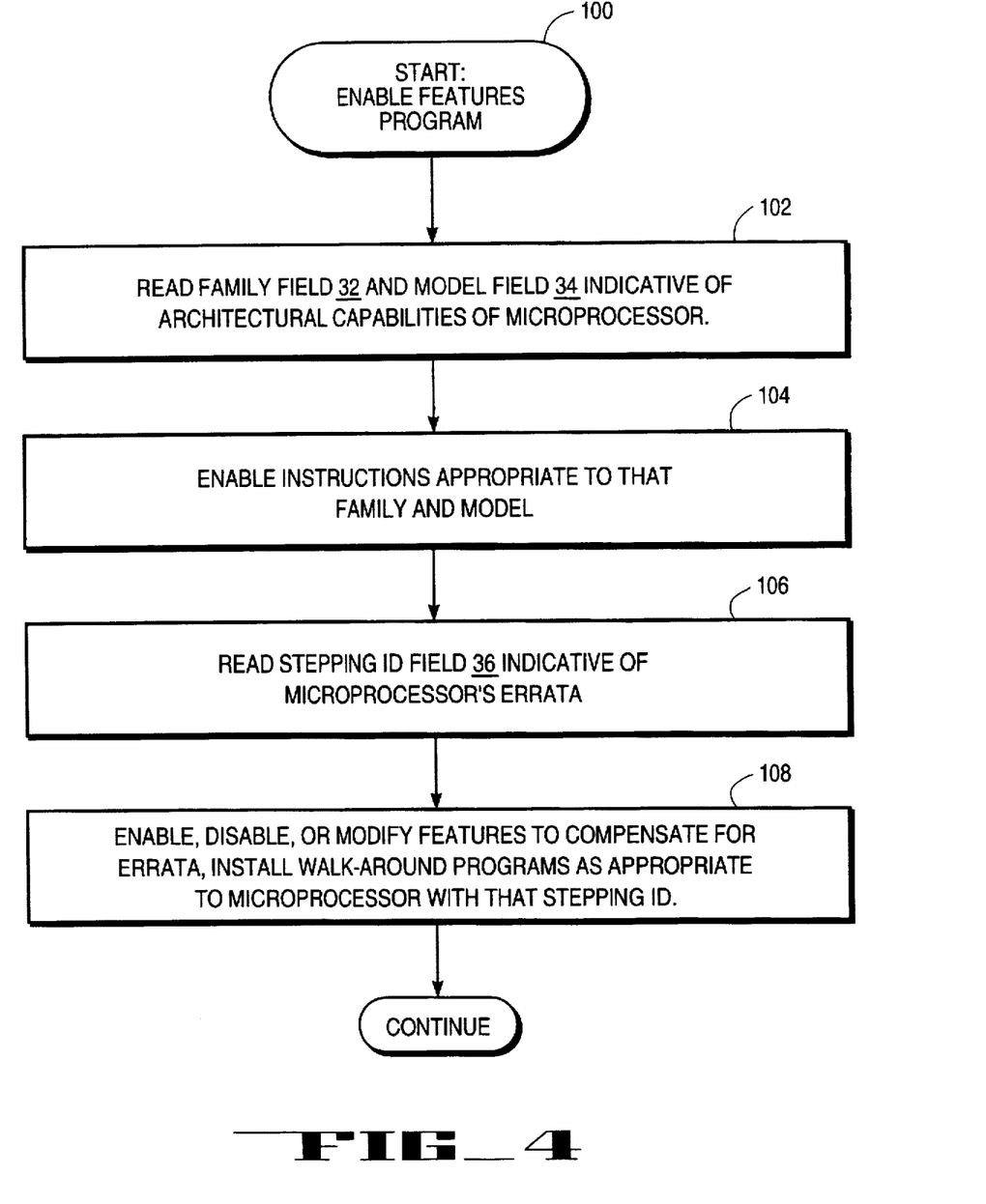
FIG. 4 is a flow chart of method steps that may occur in a microprocessor following obtaining identification information.

Reference is now made to FIG. 4, which is a flow chart illustrating enablement of features in the preferred embodiment that includes a high performance microprocessor. In a box 100, it is assumed that the CPUID instruction 54 has been executed, and the ID information 31 is available in one or more general purpose registers. In the box 100, execution of a program to enable features is started. In a step 102, the family field 32 and the model field 34 are read, to provide an indication of the architectural capabilities of the microprocessor. In the next step 104 the instructions appropriate to the indicated family and model are enabled. In a next step 106, the stepping ID field (the revision field 36) is read to provide information regarding the errata appearing on the identified version of the microprocessor. In a next step 108, features are enabled, disabled, or modified to compensate for the identified errata. This step 108 may include installing work-around programs as appropriate. Thus, the capabilities of the high performance microprocessor can be effectively utilized.

In the steps 102 and 104, the microprocessor is identified and its appropriate instructions are enabled. As an example, an improved INTEL microprocessor implements an instruction with the syntax "RDMSR", for Read from Model-Specific Register. In operation, the RDMSR instruction takes the value from a model-specific register specified in a first general purpose register (the "ecx" register), and places the high-order bits in a second general purpose register (the "edx" register) and the low-order bits in a third general purpose register (the "eax" register). A "WRMSR" instruction performs a Write from Model-Specific Register using the same registers. Examples of model-specific registers are test registers such as cache test registers. In an earlier INTEL microprocessor, the i486™ microprocessor, these test registers were accessed by a separate, dedicated "TR" command. Therefore, if a programmer needs to access these test registers, he must first identify the microprocessor, and then he will know whether the RDMSR instruction will supply him with the information he needs. If the microprocessor is identified to be the improved microprocessor, then the RDMSR and the WRMSR instructions will be chosen. However, if the microprocessor is identified as a i486™ microprocessor, then the dedicated TR commands will be chosen.

In the steps 106 and 108, the stepping ID is provided, and a program is initiated to work-around errata in the microprocessor. An example of a work-around program follows, in the context of a problem that arose with the INTEL i386™ DX™ microprocessor. In a given microprocessor, there may be many of these errors.

Under certain conditions when the POPA or POPAD instruction is used, the i386™ DX™ microprocessor executes improperly. The i386™ DX™ microprocessor inadvertently corrupts the EAX register when either the POPA or POPAD instruction is immediately followed by an instruction that uses a base address register AND an additional register other than EAX or AX as an index register to form its effective address.

The following sample code is an example of the problem:

MOV EDX,4
POPAD
MOV EBX,dword ptr[EDX+EBX*4]

Additionally, whenever a POPA (16-bit version) instruction is immediately followed by an instruction which uses the EAX (32-bit register) as a base OR index register to form its effective address, the i386™ DX™ microprocessor will hang.

The following sample code is an example of the problem:

MOV EAX,4
POPA
MOV EBX,dword ptr[EAX]

Depending on the above conditions, the EAX register will contain an undefined value or the processor will stop execution. Proper operation of the processor cannot be guaranteed after this sequence is executed until a hardware reset occurs. This sequence of instructions can occur in the Real, Protected and Virtual 86 modes of the i386™ DX™ microprocessor.

Therefore, it is important never to execute the described instruction sequences. A work-around code sequence which has proven to be successful in all cases is to insert a NOP instruction after every POPA(D) instruction. Examples are shown below:

EXAMPLE 1

MOV EDX,4
POPAD
NOP
MOV EBX,dword ptr[EDX+EBX*4]

EXAMPLE 2

MOV EAX,4
POPA
NOP
MOV EBX,dword ptr[EAX]

In summary, an identification method and apparatus is provided that does not generate an illegal opcode exception. The method is compatible with both basic and advanced microprocessors. If it is determined that the microprocessor is advanced, the method determines whether they are members of the first group that does not implement the ID instruction, or members of the second group that do implement the ID instruction. The apparatus can be implemented in all advanced microprocessors to enable easy identification to a programmer or anyone who wants to know that information. Even if the microprocessor were originally manufactured as a member of the first group of the advanced families and therefore did not implement the microprocessor ID instruction, subsequent manufacturing runs for that microprocessor can incorporate the identification apparatus. Once the microprocessor has been identified, a program can better utilize the microprocessor's features. Particularly, if the microprocessor is precisely identified, then additional features can be enabled commensurate with the microprocessor's greater capabilities. Thus, the microprocessor's capabilities can be efficiently and quickly utilized.

Appendix 1 discloses an exemplary program written to distinguish between an INTEL i386™ microprocessor, an i486™ microprocessor, and an improved microprocessor, all of which are "advanced" by the foregoing definitions. The i386™ and i486™ steps 106 and 108, the stepping ID is provided, and a program is microprocessors fall into the first group because they have a 32-bit EFLAGS register but do not implement a CPUID instruction 54, and the improved microprocessor falls into the second group because it does implement the CPUID instruction 54. If the processor is identified as the improved microprocessor, then the identification information is moved to identify the variables including the stepping ID, model and family.

Appendix 2 discloses an exemplary program written to distinguish between a basic and an advanced processor. In terms of the program, a basic processor includes the 80286 and the 8086 microprocessor families, and an advanced processor includes the i386™ microprocessor family. If the program determines that the processor is a 80286 or an 8086 microprocessor, then the processor is a basic processor. But if the program determines that the processor is an i386™ microprocessor, then the processor is "advanced" and may in fact be the i486™ microprocessor or from a future family. Appendix 2 is an example of an ad hoc program that has been used to determine processor type.

Description of a Multi-Level CPUID Instruction

The following discussion describes a two-level CPUID instruction that can be implemented in an advanced processor. Although only two levels of information are described, the system is a multi-level system that is easily adapted to providing more than two types of information.

The two-level CPUID instruction selectively supplies a first type of information that includes an indicia of origin and a number indicative of the number of levels, and a second type of information that includes the family, model, stepping ID, and features. Reference is again made to FIG. 1, which illustrates, within the constant ROM 33, a memory 200 to hold an indicia string. The indicia string is a series of characters, such as numerals or letters, that uniquely identify the origin of a microprocessor. In the preferred embodiment, the indicia string includes the letters "Genuine Intel." INTEL is a registered trademark of INTEL Corporation, and uniquely signifies goods originating therefrom.

Within the microcode 44 for executing a CPUID instruction, a microcode block 202 indicates origin identification. An example of such microcode is "case 0" in Appendix 3. Also within the microcode 44, within a block 204, processor ID instructions supply the microcode necessary to identify the family, model, stepping ID, and features of a microprocessor in accordance with the previous discussion. The microcode 202,204 will be discussed further with reference to FIGS. 5 and 6.

Still referring to FIG. 1, the other registers 24 include a third general purpose register 206 and a fourth general purpose register 208. For purposes of explanation, the third general purpose register 206 may be termed the "ecx" register, the fourth general purpose register 208 may be termed the "edx" register, the first general purpose register 20 may be termed the "eax" register, and the second general purpose register 22 may be termed the "ebx" register.

Figure 5:
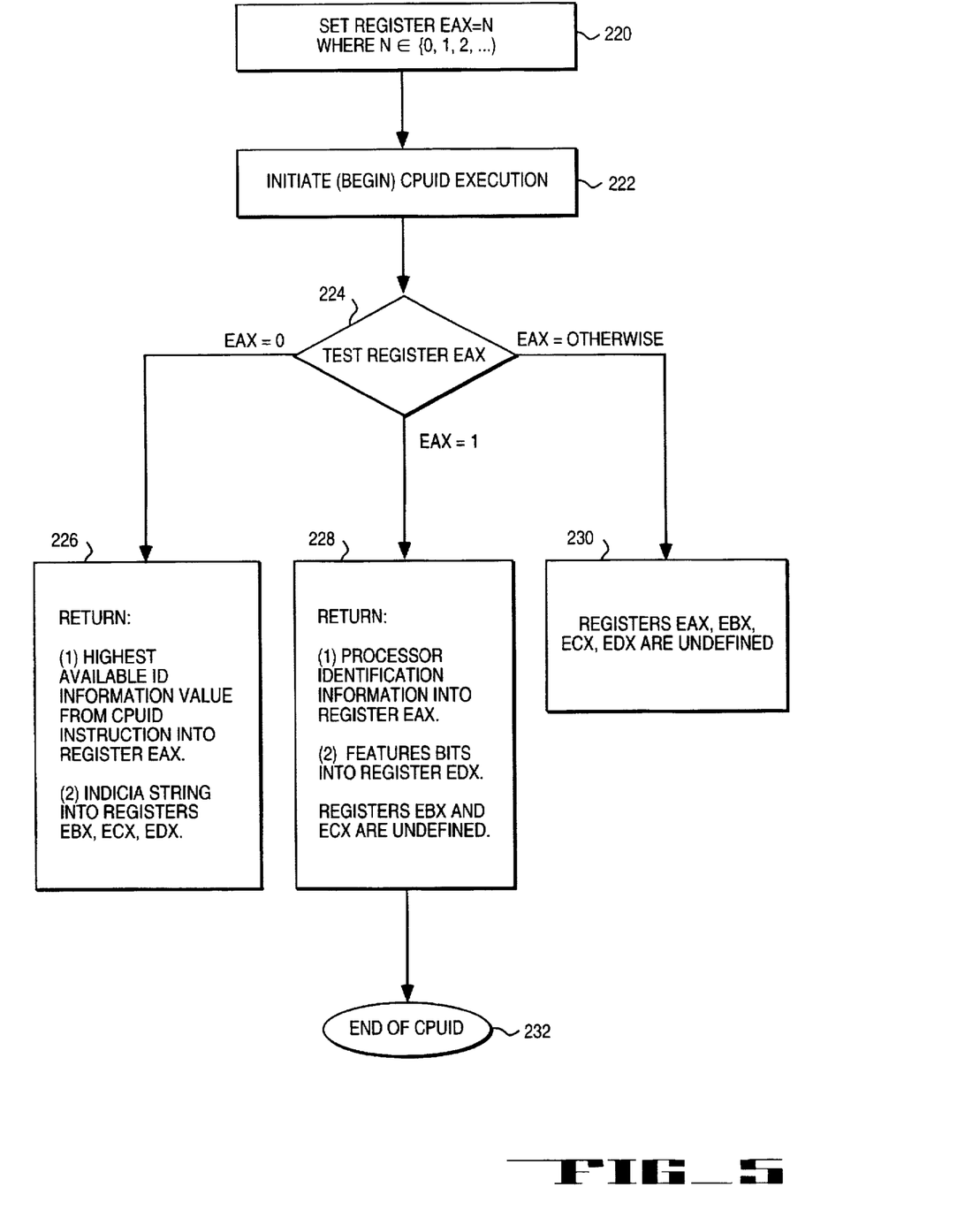
FIG. 5 is a flow chart of method steps for identifying the indicia of origin of the microprocessor, or the family, model, and stepping ID of the microprocessor.

Reference is made to FIG. 5, which illustrates a flow of operations for a two-level CPUID instruction. As illustrated in a box 220, register eax is set to an integer value of 0, 1, 2, . . . For purposes of the following discussion, values of only "0", and "1" are implemented although in other embodiments additional values may be implemented to specify additional information. Next, as illustrated in a box 222, the CPUID execution is initiated by supplying the CPUID instruction to the control unit 40 (FIG. 1). Then, operation moves to a test 224 in which register eax is tested, and dependent on the results of this test, one of several branches may be taken. If eax=0, then operation moves to a box 226, if eax=1, then operation moves to a box 228, and if eax is other than "0" or "1", then operation moves to a box 230. In the box 226, the method returns "1", the highest available ID information value (HV) from the CPUID instruction into register eax. HV is a number that specifies how many types, or levels, of ID information are available. This feature provides for future expansion into multiple levels of identification information. Therefore, the amount of information available is not limited by the size of the registers eax, ebx, and ecx. In the present instance, the value of HV in register eax is "1", which means that only levels "0" and "1" are available in the present implementation. Secondly in the box 226, the indicia string is returned into registers ebx, ecx, and edx.

In a box 228, if register eax=1, then the CPUID instruction returns the processor ID identification information, including the family, model, and stepping ID into register eax. Also, the features bits are stored into register edx. Registers ebx and ecx remain undefined, although in later implementations these registers may be given a meaning.

If eax is other than "0" or "1", then in the present example registers eax, ebx, ecx, and edx are undefined. From the boxes 226, 228, and 230, the operation continues to the box 232 which indicates that the CPUID instruction execution is complete.

Figure 6:
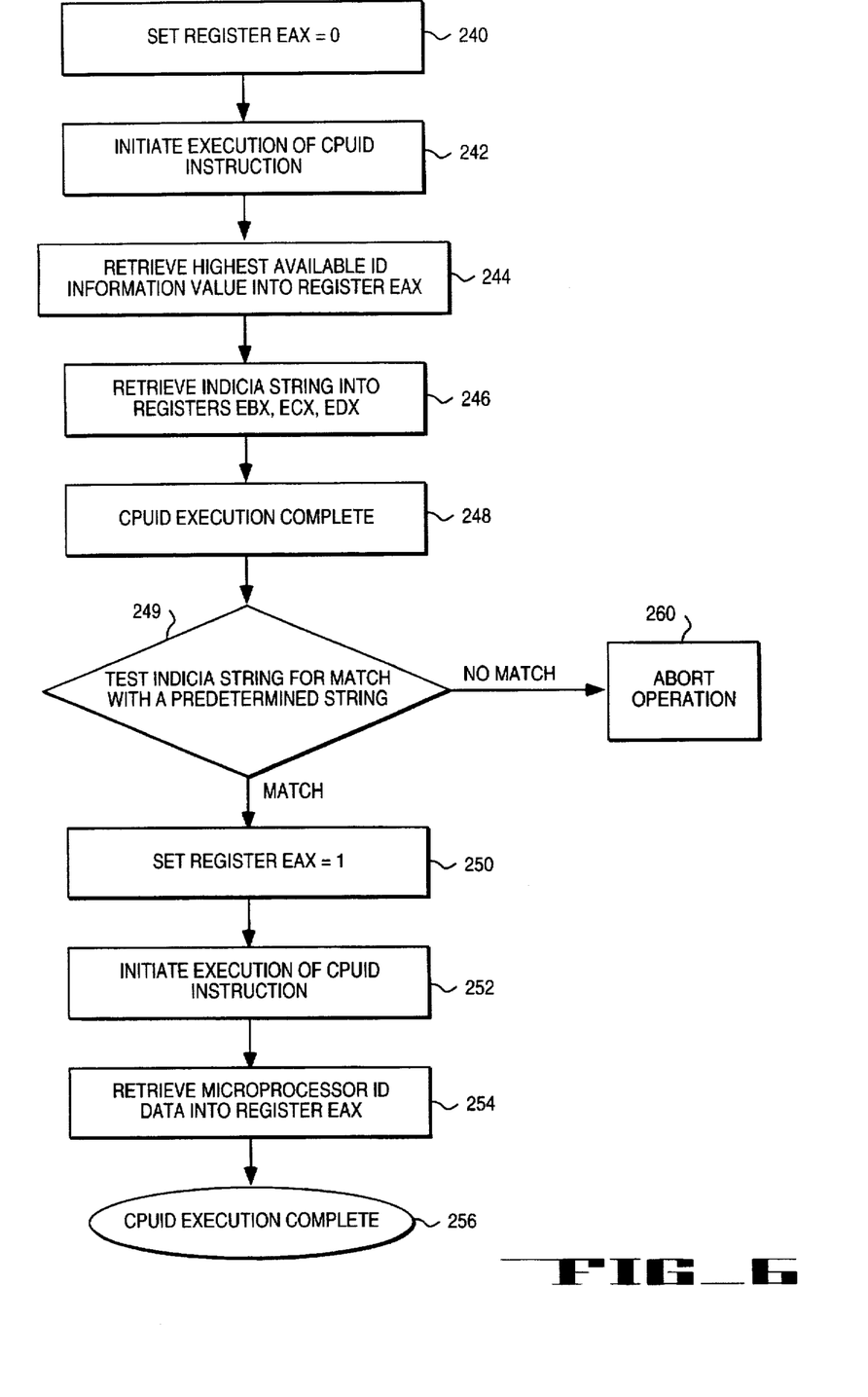
FIG. 6 is a flow chart illustrating a method for first identifying the origin of a microprocessor, and then identifying the microprocessor.

Reference is made to FIG. 6, which is an illustrative method of utilizing the two-level CPUID instruction to identify the number of levels of ID information that are available and the origin of the microprocessor, and then to retrieve information from the second ("1") level of ID information. Beginning in the box 240, register eax is set to "0". In a box 242, execution of CPUID instruction is initiated. Following that, in a box 244, the highest available ID information value (HV) is retrieved into register eax. Next, in a box 246, the indicia string is retrieved into registers ebx, ecx, and edx. Then, as illustrated in a box 248, CPUID instruction execution is complete. From the box 248, the operation moves to a box 249, in which steps are executed to verify the origin of the microprocessor. The steps are performed with instructions in a program. For example, the contents of registers ebx, ecx, and edx may be compared with the desired indicia string, and such a program can be easily designed by one skilled in the art. Verifying the origin of the microprocessor is more fully described below with reference to Appendix 3.

From the box 248, operation moves to a decision 249 which branches to one of two paths based upon the outcome of the verification in the box 248. If the origin is verified, then operation moves to the box 250 which illustrates that register eax is set to "1". Then, as illustrated in a box 252, execution of the CPUID instruction is initiated. Following that, in the box 252, the microprocessor ID data is retrieved into register eax. Next, as illustrated in a box 256, CPUID instruction execution is complete. However, if the verification in the box 248 does not verify the correct origin of the microprocessor, a predetermined string, then operation moves to a box 260, in which the operation may be aborted. Operation in the box 260 is discretionary with a programmer, and he may choose not to abort the operation but may, instead, choose to continue operation with alternate programs or alternate sequences, or may continue operation without any modifications.

Appendix 3 discloses an exemplary microcode program for implementing a two-level CPUID instruction. The program is implemented in an improved INTEL microprocessor following the i486™ microprocessor family. In Appendix 3, the switch (eax) instruction is a branch dependent upon the value in register eax. If eax=0 then the branch is to "Case 0", if eax=1 then the branch is to "Case 1", and if register eax has a value other than "0" or "1", then the default branch is taken.

Generally, the CPUID instruction makes information available to software to identify the microprocessor but only if it has implemented the (CPUID) instruction. FIG. 2 and the accompanying discussion describes the tests for determining if the CPUID instruction has been implemented. The microcode in Appendix 3 would be executed only if the microprocessor has implemented the CPUID instruction. Using the two-level CPUID instruction in Appendix 3, an INTEL microprocessor can be identified by the following program steps:

1. The software identifies that it is executing on an INTEL microprocessor by issuing the following instructions:

```
mov     eax,0
cpuid
``` and then checking for the indicia of origin, "GenuineIntel," in ecx, edx, and ebx registers.

The indicia of origin can be verified using any conventional method. For example, a straightforward way of verifying the indicia of origin ("GenuineIntel") is to implement an algorithm that compares each register with a constant:

```
if ecx = 6C65746EH and
   edx = 49656E69H and
   ebx = 756E6547H,
``` then the indicia of origin is verified.

As implemented, it may be noticed that if registers ecx, edx, and ebx were read directly, they would read "letnIeniuneG". The data is stored in the registers in this order to facilitate display of the indicia of origin. Appendix 4 illustrates a program written in DOS to display "GenuineIntel" on a screen. When the contents of the registers are written to memory, the order of the 8-bit bytes is automatically reversed by the mechanism that writes to memory. Therefore, when the indicia of origin is displayed it is in the correct order on the screen.

2. The software may request additional INTEL microprocessor information by issuing:

```
mov     eax,1
cpuid
```

By executing "mov eax, 1" and "cpuid", an exemplary improved INTEL microprocessor (termed "P-5" in Appendix 3) returns "5" in the family field (eax[11:8]). For the first model, the exemplary improved microprocessor assigns a "0" to the model field (eax[7:4]) to indicate that it is the first model. For the first revision of the exemplary improved microprocessor, the stepping-id field (eax[3:0]) contains a unique identifier for the revision history. Registers ebx, ecx are reserved and identified.

The improved microprocessor sets the features register (edx) to 3FH to indicate that the improved microprocessor supports the following features:

bit 0: floating-point on the chip;
bit 1: enhanced V86 mode;
bit 2: I/O breakpoint;
bit 3: page size extension;
bit 4: time stamp counter;
bit 5: model specific registers;
bits 6-31: RESERVED
bit 6: 36-bit address;

In later implementations another value representative of a different set of features may be stored in the features register (edx).

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

APPENDIX 1
PROGRAM EXAMPLE USING CPUID INSTRUCTION

```
EFL_AC  EQU 40000H              ;alignment check (1->check)
EFL_ID  EQU 200000h             ;cpuid opcode (1->supported)
cpu_family    DD    ?
cpu_model     DD    ?
cpu_stepping  DD    ?
    pushf                       ;push FLAGS value on stack
    pop     eax                 ;get FLAGS into AX
    push    eax                 ;save original FLAGS
    mov     ecx, eax            ;save copy of FLAGS
    xor     eax, EFL_AC         ;flip AC bit for new FLAGS
    push    eax                 ;push new value on stack
    popf                        ;attempt setting FLAGS.AC
    pushf                       ;push resulting FLAGS on stack
    pop     eax                 ;get that into AX
    cmp     eax,ecx             ;succeeded in flipping AC?
    je      cpu_is_386          ; AX is same as CX for i386 cpu
    mov     eax, ecx            ;get original FLAGS again
    xor     eax, EFL_ID         ; flip ID bit for new FLAGS
    push    eax                 ;push new value on stack
    popf                        ;attempt setting FLAGS.ID
    pushf                       ;push resulting FLAGS on stack
    pop     eax                 ;get that into AX
    cmp     eax,ecx             ;succeeded in flipping ID?
    je      cpu_is_486          ;AX is same as CX for i486 cpu
    cpuid                       ;get cpu family-model-stepping
                                ;(sets eax, ebx, ecx, edx!)
    mov     ebx, eax            ;extract stepping id
    and     ebx, 00Fh           ;   from bits [3:0]
    mov     cpu_stepping,ebx
    mov     ebx, eax            ; extract model
    and     ebx, 0F0h           ;   from bits [7:4]
    shr     ebx,4
    mov     cpu_model,ebx
    mov     ebx, eax            ; extract family
    and     ebx, F00h           ;   from bits [11:8]
    shr     ebx, 8
    mov     cpu_family, ebx
    jmp     cpu_identified
cpu_is_486:
    mov     cpu_family,4
    jmp     cpu_identified
cpu_is_386:
    mov     cpu_family,3
cpu_identified:
    popf                        ;restore original FLAGS
```

APPENDIX 2
PROGRAM EXAMPLE TO DISTINGUISH BETWEEN BASIC AND ADVANCED PROCESSOR

```
; DISTINGUISHES BETWEEN ADVANCED PROCESS
 (i386TM and above), 80286 and 8086
    pushf                   ; save FLAG register
    pop bx                  ; store FLAGs in BX
    and bx, 0fffh           ; clear bits 12-15
    push bx                 ; store on stack
    popf                    ; pop word into the
                              FLAG register
    pushf                   ; store FLAGs on stack
    pop ax                  ; recover FLAG word
    and ax, 0f000h          ; if bits 12-15 are set, then the
    cmp ax, 0f000h          ;   processor is an 8086
    jz is_8086              ;
    or bx,0f000h            ; try to set FLAG bits 12-15
    push bx                 ; store on stack
    popf                    ; pop word into the FLAG
                              register
    pushf                   ; store FLAGs on stack
    pop ax                  ; recover FLAG word
    and ax,0f000h           ; if bits 12-15 are cleared, then
    jz is_80286             ; the processor is an 80286
```

APPENDIX 2
PROGRAM EXAMPLE TO DISTINGUISH BETWEEN BASIC AND ADVANCED PROCESSOR

```
is_80386:                  ; else the processor is
                             "advanced"
    mov ax,386h            ; set the 386 DX CPU indicator
    jmp done
is_80286:
    mov ax,86h             ; set the 8086 indicator
done:
    popf                   ; record FLAG register
    ret
is_386     endp
```

APPENDIX 3
MICROCODE PROGRAM FOR IMPLEMENTING TWO LEVEL CPUID INSTRUCTION

```
CPUID - CPU identification
Syntax: CPUID
Encoding:       00001111 10100010  (OF A2)
Operation:
    switch (eax)
    case 0:
            eax"HV;      (*hv=1 for p5 *)
                        (*
                        *HV is the highest input
                        *value that
                        *is understood by
                        *CPUID
                        *)
                        (*
                        *In memory, say after PUSHA, youtll see
                        *
                        * GenuineIntel
                        * Y       Y
                        * Ω       +-- highest memory location
                        * +-- lowest memory location
                        *)
            ecx"6C65746EH       (* letn  *);
            edx"49656E69H (*    leni  *);
            ebx"756E6547H (*    uneG  *);
            break;
    case 1:
            * eax[3:0]          "Stepping ID;
            eax[7:4]            "Model;
            eax[11:8]           "Family;
            eax[31:12]          "Reserved;
            ebx "reserved;
            ecx "reserved;
            edx "3PH;           (* feature bits *)
            break;
    default:    (* eax>HV *)
        eax "reserved, undefined;
        ebx "reserved, undefined;
        ecx "reserved, undefined;
        break;
end-of-switch
```

APPENDIX 4

```
        DOSSEG
        • Model      small
        • Stack      100H
        • Data
cpuBuf  DB           12 Dup (0)    ; set up variable
                                   ; cpuBuf
        DB           13, 10, "$"   ; 13=CR, 10=LF,
                                   ; "$"=end of
                                   ; characters
        • code
-main:  mov          ax, @data     ; set up data
```

APPENDIX 4 -continued

```
        mov          ds, ax
        mov          eax, 0            ; request level zero
        CPUID                          ; execute CPUID
        mov          [cpuBuf], ebx     ; moves registers
        mov          [cpuBuf+4], edx   ; ebx, edx, ecx to
        mov          [cpuBuf+8], ecx   ; memory at
                                       ; variable cpuBuf
        mov          dx, offset cpuBuf ; display on screen
        mov          ah,9
        int          21H
        move         ah, 4CH           ; terminate the
                                       ; program
        int          21H
        End          -main
```

What is claimed is:

1. A method for determining microprocessor attributes in response to an ID instruction, wherein the microprocessor performs the steps comprising:

a) reading a first type of information from a processor memory element in the microprocessor in response to the ID instruction, wherein the first type of information specifies an available number of levels of identification information;

b) storing at least a portion of the first type of information in at least one register in the microprocessor;

c) retrieving additional information from the processor memory element, if the first type of information indicates that more than one level of information is available.

2. The method of claim 1 wherein the additional information comprises data fields of microprocessor-specific information including at least one of a family data field, a revision history data field, a serial number data field, and a model data field.

3. A method of identifying a microprocessor in response to an ID instruction from a program executing on the microprocessor, wherein the microprocessor performs the steps comprising:

a) receiving the ID instruction;

b) receiving a level indicator identifying a level of microprocessor identification information from a plurality of levels of microprocessor identification information stored in a memory in the microprocessor;

c) reading a selected microprocessor identification information from the memory in accordance with the level indicator; and d) storing at least a portion of the selected microprocessor identification information in a microprocessor memory register for access by the program.

4. The method of claim 3 wherein the selected microprocessor identification information includes feature data indicative of features of the microprocessor.

5. The method of claim 3 wherein the selected microprocessor identification information includes an indicia of origin of the microprocessor.

6. A method for determining microprocessor attributes in response to an ID instruction, wherein the microprocessor performs the steps comprising:

a) reading a first type of microprocessor identification information from a processor memory element in the microprocessor in response to the ID instruction, the processor memory element storing levels of microprocessor identification information;

b) storing at least a portion of the first type of information in at least one register in the microprocessor;

c) comparing the first type of information with a predetermined string;

d) retrieving additional microprocessor identification information from the processor memory element, if the first type of information matches the predetermined string.

7. The method of claim 6 wherein the first type of microprocessor identification information is an indicia of origin.

8. The method of 7 wherein the indicia of origin includes a string of consecutive characters, the consecutive characters comprising "INTEL".

9. The method of 8 wherein the consecutive characters are stored in a reverse order as "LETNI".

10. In a microprocessor, an identification apparatus for identifying the microprocessor in response to an ID instruction, the apparatus comprising:

a register;

a processor memory element storing multiple levels of microprocessor identification information;

a decoder for decoding program instructions including an ID instruction associated with a level indicator operand; and control circuitry coupled to the decoder, said control circuitry reading at least one level of microprocessor identification information from the processor memory element in accordance with the level indicator operand and storing at least a portion of the one level of microprocessor identification information in the register in response to the ID instruction received by the decoder.

11. The apparatus of claim 10 wherein the processor memory element is a read only memory.

12. The apparatus of claim 10 wherein the control circuitry includes microcode.

13. The apparatus of claim 10 wherein the levels of microprocessor identification data includes feature data representing features of the microprocessor.

14. The apparatus of claim 10 wherein the at least one level of microprocessor identification data includes a consecutive string of characters, wherein the characters include "INTEL".

15. The apparatus of claim 14 wherein the consecutive string of characters is stored in reverse order as "LETNI".

* * * * *